United States Patent Office 3,047,862
Patented July 31, 1962

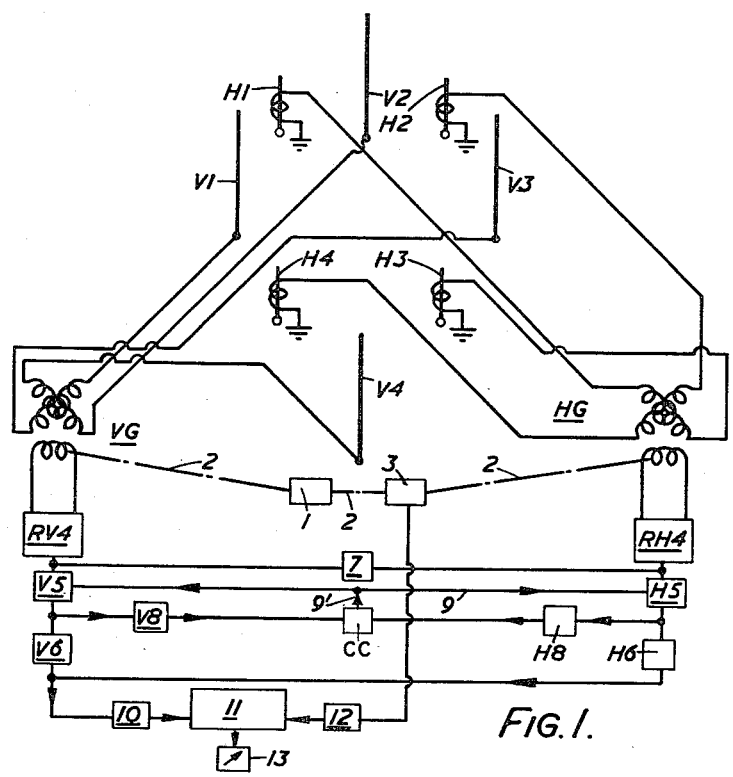
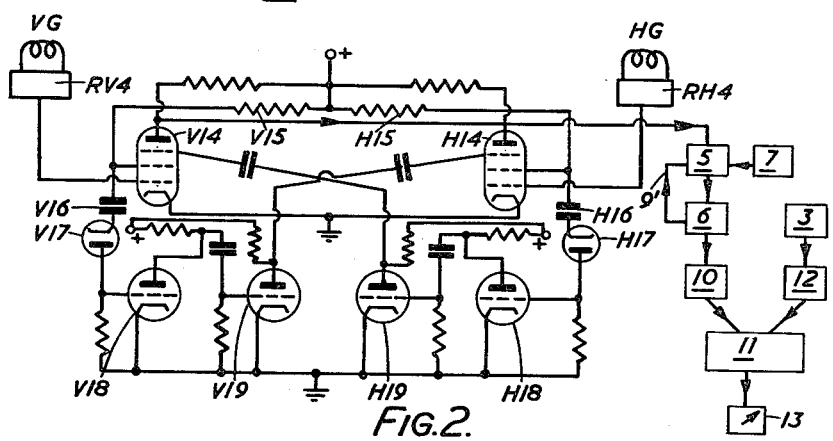

3,047,862
RADIO DIRECTION FINDERS
Sidney Arthur Walter Jolliffe, Maldon, England, assignor to Marconi's Wireless Telegraph Company Limited, London, England, a company of Great Britain
Filed Apr. 18, 1958, Ser. No. 729,440
Claims priority, application Great Britain May 20, 1957
3 Claims. (Cl. 343—113)

This invention relates to radio direction finders.

A well known difficulty met with in many radio direction finders is that sometimes termed polarization error. If the directional aerial system is, for example, vertically polarized, considerable errors may and do occur as the result of the reception of horizontally polarized waves and, similarly, vertically polarized waves may cause large errors in a direction finder having a horizontally polarized directional aerial system. It is known to avoid this defect by providing in a radio direction finder a plurality of groups of antennas each comprising a plurality of radiator elements with different directivity characteristics inter se, corresponding elements of the groups lying in parallel planes and acting as a directive array and a bearing indicator being arranged to be selectively connected to any of the arrays. In one arrangement each group comprises a vertical rod-like antenna and a horizontal loop and an automatically actuated relay arrangement is provided to connect to the bearing indicator that of the two systems which is for the time being the more effective.

It may, however, be shown that if what is, in effect, an omni polarized direction finder (i.e. a direction finder which will operate satisfactorily and with acceptable accuracy, irrespective of the polarization of incoming waves) is sought to be obtained by utilizing two aerial systems which are polarized in mutually perpendicular planes and providing means for connecting to a suitable indicator apparatus whichever of these two systems is for the moment more effective, it is essential, if satisfactory accurate and reliable results are to be obtained, for the two aerial systems to be, for all practical purposes, entirely uncoupled. Although theoretically any two plane polarized aerials, plane polarized in perpendicular planes (e.g. a vertical rod aerial and a horizontal loop aerial) will be uncoupled (or may be arranged to be so) it is, in practice, extremely difficult, if not impossible, to obtain the necessary degree of lack of coupling if they are close together and, in practice, there will occur substantial coupling between the two aerials. In one known arrangement, for example there is used a vertical rod-like antenna which passes through a horizontal loop. The latter is coaxial with respect to the rod, and there will in practice be appreciable radiation coupling between the rod and loop, for both will be of fairly large physical extent and the required perfection of symmetry necessary for complete decoupling will not, in practice, be obtained.

The present invention seeks to overcome this difficulty and to provide improved direction finders in which the said difficulty is, if not avoided altogether, at any rate reduced to very small and acceptable amounts. As will be seen later, radio direction finders in accordance with this invention may be used over any of a wide band of frequencies including the medium frequency, high frequency and very high frequency bands.

According to this invention a radio direction finder comprises two directional aerial systems, one comprising a plurality of ferrite rod aerials responsive to the magnetic field of an incoming wave and having one plane of polarization, and the other comprising a plurality of conductive rod aerials parallel to the ferrite rod aerials and displaced therefrom and responsive to the electric field of an incoming wave and having a plane of polarization perpendicular to said one plane, and means responsive to signals derived from that of the two aerial systems which, at any given time, is providing the more powerful signal, for ascertaining the incoming signal direction.

Each directional aerial system preferably comprises a plurality of spaced aerials with an associated radio-goniometer though it is possible, though not preferred, to employ mechanically rotated directional aerials or aerial systems.

Preferably the aerial system which is responsive to the magnetic field of an incoming wave is a ferrite aerial system.

In one way of carrying out the invention a separate receiver is provided for the signals from each aerial system and common automatic gain control is provided for both receivers, said common gain control being actuated by the signal in that receiver which, for the time being, has the stronger signal, the gain controlled output for the two receivers being combined and fed to the means for ascertaining incoming signal direction.

In another way of carrying out the invention signals from both aerial systems are fed to a common receiver through separate paths each of which includes a gate which is controlled in dependence on the signal strength fed into the other path, each gate being adapted to block its path when the other path is opened and each being controlled to block its path when the other path receives the stronger signals.

The invention is illustrated in the accompanying drawings which show diagrammatically two embodiments thereof. Like references denote like parts in the figures.

Referring first to FIG. 1, the direction finder therein illustrated comprises two directional aerial systems each consisting of four aerial elements and a radio goniometer, the two aerial systems being in effect interleaved. In the particular example illustrated in FIG. 1, one aerial system consists of four vertical unipoles V1, V2, V3 and V4 upstanding from a "phantom earth" (not represented) and arranged at the corners of a square, together with an associated radio goniometer generally designated VG. The other aerial system consists of four ferrite aerials H1, H2, H3 and H4, also at the corners of a square and upstanding from the "phantom earth," and having an associated radio goniometer generally designated HG. The aerial elements of the one system are symmetrically positioned between the aerial elements of the other. The usual pick-up coils are schematically represented on the ferrite aerials. The four unipoles V1, V2, V3 and V4 with their goniometer Vg constitute a vertically polarized aerial system responsive to the electric field of an incoming wave, while the elements H1, H2, H3 and H4 with their goniometer HG constitute a horizontally polarized system responsive to the magnetic field of an incoming wave. These two systems are, practically speaking, completely uncoupled from one another, a result which is achieved mainly due to the fact that the elements of one respond to the electrical field, while the elements of the other respond to the magnetic field. The obtaining of this good degree of decoupling is facilitated by the fact that the ferrite aerial elements are physically quite small compared to the other aerial elements. Although, for the sake of simplicity in the drawing, unipoles are shown in FIG. 1, obviously other suitable forms of aerial could be used. Indeed it is theoretically possible, though not preferred, to replace the illustrated aerial systems, each consisting of fixed aerial elements and a radio goniometer, by mechanically rotated aerials or aerial systems, so long, of course, that they are polarized in mutually perpendicular planes and that one responds to the electrical field and the other to the magnetic field. Again in FIG. 1, inductive radio goniometers are shown, but obviously other forms of goniometer, e.g. the capacity type, could equally well be used. The search coils of the two goniometers are rotated at a required predetermined speed, for example, at 25 revolutions per second, by an electric motor 1 through suitable mechanical drives represented by the chain lines 2, the motor also driving a reference frequency generator 3 producing the same frequency (e.g. 25 c./s.).

Output from the search coil of the goniometer VG is fed to a radio frequency amplifier RV4 followed by an intermediate frequency amplifier V5 and a detector V6, while output from the search coil of the goniometer HG is fed to corresponding radio frequency amplifying, intermediate frequency amplifying and detecting units RH4, H5 and H6 respectively. The intermediate frequency for both amplifier V5 and H5 is obtained by beating with the oscillations from a common local oscillator 7. The signals from the amplifier V5 are used in known manner to produce a gain controlling potential by means of a suitable known detecting circuit V8 and a similar circuit H8 producing a gain controlling potential from the output of the amplifier H5 is provided. The two gain control units V8 and H8 feed into a common gain control circuit $cc$ which combines these two signals and delivers a feedback over line 9 controlling both intermediate frequency amplifiers V5 and H5. Common gain control circuit $cc$ may be of the type disclosed in British Patent 569,576, issued May 30, 1954. If this type of common gain control circuit is employed, the gain control units V8 and H8 will be connected to terminals $1t'$ and $2t'$ while the combined output lead $9'$ in the instant specification will be connected to the sliding contact on a resistor corresponding to $pr$ in the British patent. The operation of circuit $cc$ will be identical to that described in the above-mentioned British patent. The automatic gain control is such that the individual gain control unit V8 or H8 developing the highest automatic gain control voltage will control the gain of both intermediate frequency amplifiers V5 and H5. The intermediate frequency amplifiers will be controlled in such a manner that whichever of these intermediate frequency amplifiers has the smaller input signal, that amplifier will be rendered less sensitive.

The outputs from the detectors V6 and H6 are combined and fed through a suitable filter circuit 10 adapted to pass the 25 c./s. frequency, to a known phase detector 11 whose second input is obtained through a 25 c./s. filter 12 from the reference frequency generator 3. The phase detector operates in well known manner to compare the phase of the two inputs fed thereto and produce an output dependent on the phase relation between them. This relation, which depends on incoming signal direction, is utilized to actuate a direction indicator, e.g. a cathode ray tube or meter.

With this arrangement, due to the gain control system employed, the directional aerial system which will be effectively in operation at any one time will be that system which is receiving, for the moment, the larger signal, and the indicator 13 will indicate the incoming signal direction by utilizing the signals from the said aerial system which for the moment is the more effective. A not unimportant advantage of the arrangement of FIG. 1 is that it does not involve any switched circuits.

FIG. 2 shows, so far as is necessary to appreciate its differences from FIG. 1, a second embodiment. The aerial systems used in the arrangement of FIG. 2 are the same as in FIG. 1 and, accordingly, in order to simplify the drawing, the actual aerials and the stators of the radio-goniometers are not shown in FIG. 2, only the search coils of the two goniometers being shown. These are marked VG and HG in FIG. 2. These search coils are driven by a motor 1 as in FIG. 1 and feed into radio frequency amplifiers RV4 and RH4. There is a frequency generator 3 driven by a motor as in FIG. 1 but, again to simplify the drawing, the motor is not shown in FIG. 2 reference. Output from the amplifier RV4 is fed to the control grid of a gate valve V14 of the pentode type, while output from the amplifier RH4 is fed to the control grid of a similar gating pentode H14. Each of these pentodes is gated by signals applied to its suppressor grid and in dependence on the signal strength fed to the control grid of the other pentode. As will be seen, the screen grid of the valve V14 is connected to a source of positive potential through a resistance V15 and is also connected through a blocking condenser V16 and a diode V17 to the control grid of a valve V18 whose anode is resistance capacity coupled to the control grid of a further valve V19 whose anode is in turn connected to the suppressor grid of the valve H14. Circuit elements H16, H17, H18 and H19 are associated with the valve H14 in the same way as that in which the elements V16 to V19 are associated with the valve V14 and the anode of the valve H19 is connected to the suppressor grid of the valve V14. The arrangement is such that only one of the valves H14, V14 will pass signals at any time, that valve being the one which receives the signals which are, for the time being, the stronger. The two valves V14 and H14 have a common anode circuit which feeds into an intermediate frequency amplifier 5 with which is associated a local oscillator 7 and which is followed by a detector 6. The detector 6 also provides automatic gain controlling potential which is fed over line $9'$ to control the gain of the intermediate frequency amplifier 5. A phase detector 11 corresponding to the phase detector 11 of FIG. 1 actuates a bearing indicator 13 in response to the two inputs that are fed to it, one being derived from the detector 6 and the other from the reference frequency source 3 in each case through a suitable filter 10 or 12.

With this arrangement the valves V14 and H14 act as gates leading to the intermediate frequency amplifier 5 and whichever radio frequency amplifier RV4 or RH4 is for the moment providing the stronger signal will supply its signal to the intermediate frequency amplifier 5 and close the gate (i.e. block the path leading to said amplifier 5) from the other radio frequency amplifier.

It is of course not necessary in FIG. 2 to put the radio frequency amplifiers RV4 or RH4 as shown in the separate channels from the two aerial systems since a common radio frequency amplifier could precede the intermediate frequency amplifier 5 in the common channel to the indicator. The illustrated arrangement is, however, preferred since it provides a powerful signal for control of the gating valves V14, H14.

I claim:

1. A radio direction finder comprising two directional aerial systems, one of said aerial systems comprising a plurality of ferrite rod aerials responsive to the magnetic field of an incoming wave and having one plane of polarization, and the other of said systems comprising a plurality of conductive rod aerials parallel to said ferrite rod aerials and displaced therefrom, said conductive rod aerials being responsive to the electric field of an incoming wave and having a plane of polarization perpendicular to said one plane, means responsive to signals derived from that of the two aerial systems which, at any given time, is providing the more powerful signal for ascertaining the incoming signal direction, and wherein each aerial system includes a plurality of spaced aerials with an associated radio-goniometer.

2. A radio direction finder comprising two directional aerial systems, one of said aerial systems comprising a plurality of ferrite rod aerials responsive to the magnetic field of an incoming wave and having one plane of polarization, and the other of said systems comprising a plurality of conductive rod aerials parallel to said ferrite rod aerials and displaced therefrom, said conductive rod aerials being responsive to the electric field of an incoming wave and having a plane of polarization perpendicular to said one plane, means responsive to signals derived from that of the two aerial systems which, at any given time, is providing the more powerful signal for ascertaining the incoming signal direction, further including a separate receiver for the signals from each aerial system and common automatic gain control for both receivers, said common gain control being actuated by the signal in that receiver which, for the time being, has the stronger signal, the gain controlled output from the two receivers being combined and fed to the means for ascertaining incoming signal direction.

3. A radio direction finder comprising two directional aerial systems, one of said aerial systems comprising a plurality of ferrite rod aerials responsive to the magnetic field of an incoming wave and having one plane of polarization, and the other of said systems comprising a plurality of conductive rod aerials parallel to said ferrite rod aerials and displaced therefrom, said conductive rod aerials being responsive to the electric field of an incoming wave and having a plane of polarization perpendicular to said one plane, means responsive to signals derived from that of the two aerial systems which, at any given time, is providing the more powerful signal for ascertaining the incoming signal direction, and wherein a common receiver is connected to receive signals from both aerial systems through separate paths each of which includes a gate which is controlled in accordance with the signal strength fed into the other path, each gate being adapted to block its path when the other path is opened and each gate being controlled to block its path when the other path receives the stronger signals.

References Cited in the file of this patent
UNITED STATES PATENTS

| | | |
|---|---|---|
| 2,226,366 | Braden | Dec. 24, 1940 |
| 2,422,107 | Luck | June 10, 1947 |
| 2,513,313 | Hansel | July 4, 1950 |
| 2,644,885 | Atwood | July 7, 1953 |